Patented Sept. 15, 1931

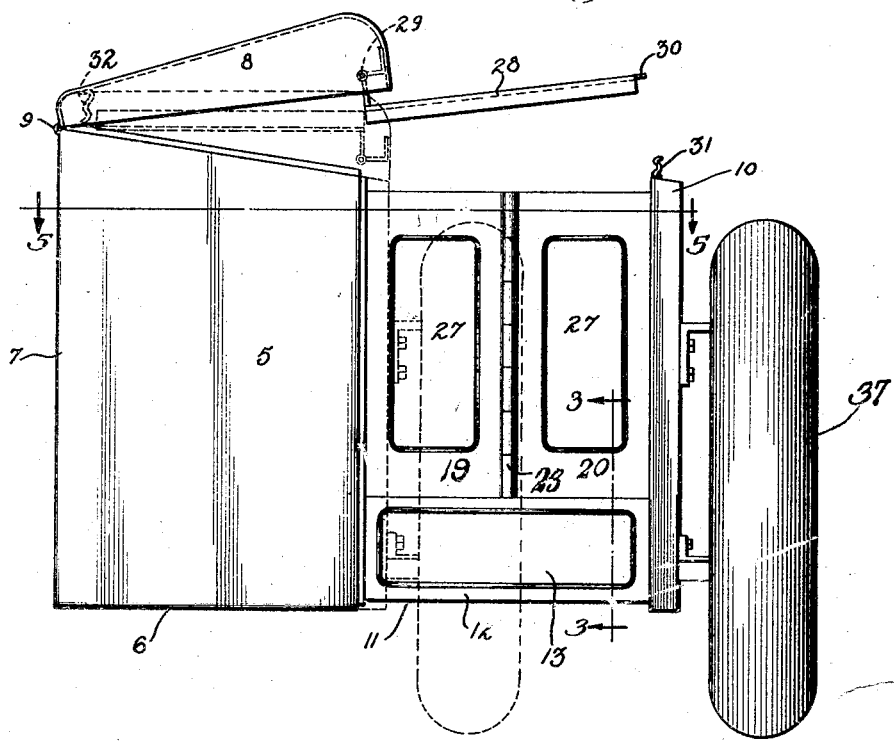

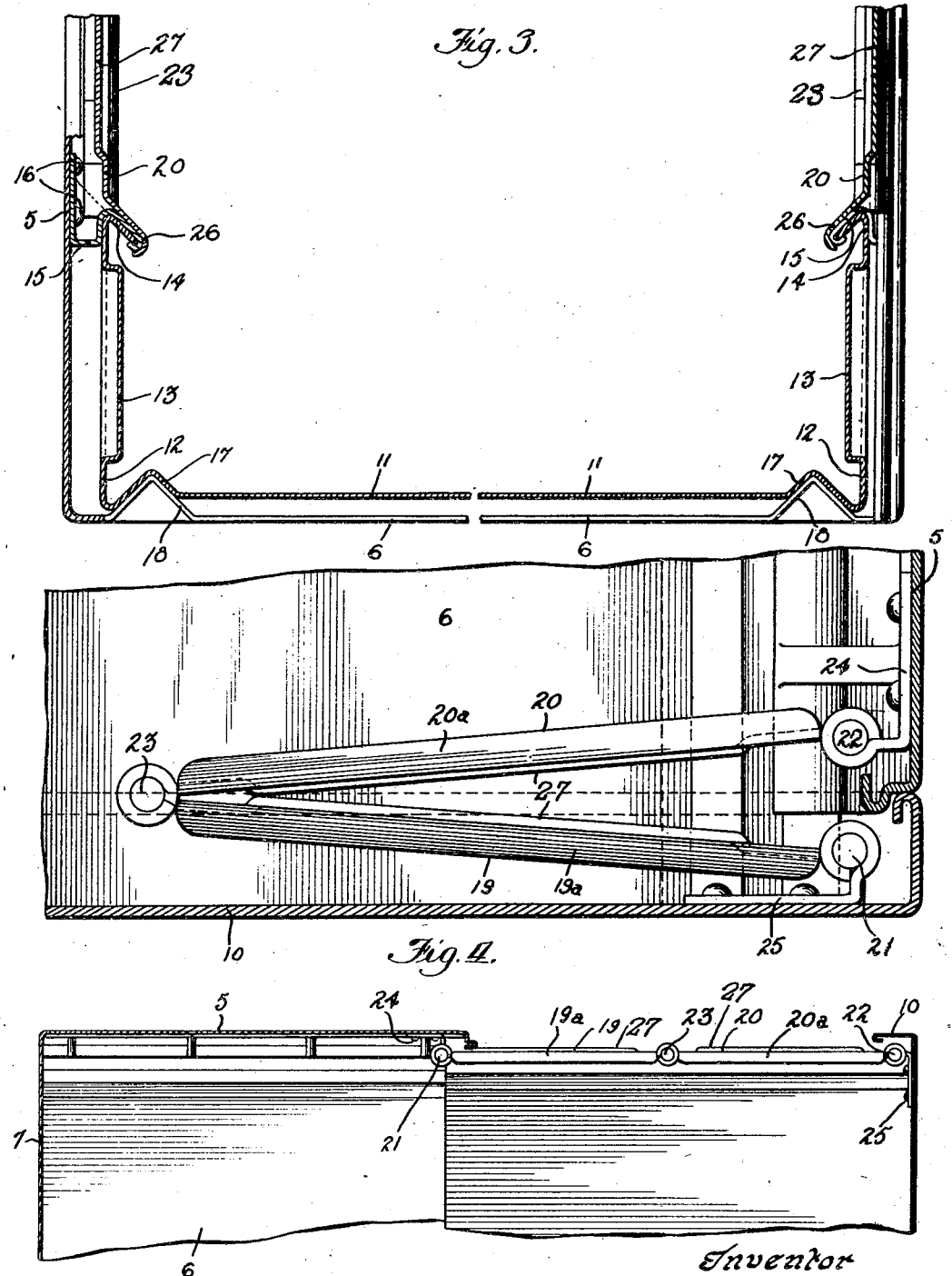

1,823,515

UNITED STATES PATENT OFFICE

PHILMORE F. SPERY, OF CHICAGO, ILLINOIS, ASSIGNOR, BY MESNE ASSIGNMENTS, TO KARI-KEEN MANUFACTURING COMPANY, OF SIOUX CITY, IOWA

EXTENSION TRUNK AND LUGGAGE CARRIER

Application filed November 1, 1928. Serial No. 316,533.

My invention relates to trunks of the type carried at the rear of automobiles and like vehicles, and more particularly to such types of trunks that are extensible to enlarge their capacity at such time as greater contents are to be carried, and my main object is to provide a novel expedient whereby the extension may be well and rigidly supported.

A further object of the invention is to build the extension of the trunk on the fundamental lines of a drawer, so that the same may form a rigid and strong structure initially.

Another object of the invention is to design the novel extension with a peculiar arrangement involving folding sides, which assume a compact position when the trunk is in normal or unextended condition.

A still further object of the invention is to design the folding sides of the extension with means to form a support for the latter.

A final, but nevertheless important object of the invention is to design the novel extension with few and simple parts, in order that the same may be manufactured cheaply and handled with ease.

With the above objects in view and any others that may suggest themselves from the specification and claims to follow, a better understanding of the invention may be gained by reference to the accompanying drawings, in which—

Figure 1 is a side elevation of the trunk, as extended and with the lid partly raised;

Fig. 2 is a plan view of the trunk as in normal or unextended condition;

Fig. 3 is an enlarged fragmental section on the line 3—3 of Figure 1;

Fig. 4 is an enlarged plan section of the lower right-hand corner of the trunk illustrated in Figure 2; and Fig. 5 is a section on the line 5—5 of Figure 1, showing the assembly fragmentally.

In the design of an extension for automobile trunks, it must be taken into consideration that an extension on the order of a drawer is apt to sag more or less when weighted with contents or by a spare tire adjunct, as illustrated. If the extension is suitably reinforced from the drawer proper to minimize sagging or looseness, the question of material becomes involved, and frequently predicates considerable expense in that connection. It has therefore been my intention to provide an extension of maximum capacity which is at the same time rigidly supported and involves no loss in the way of materials.

In the drawings, 5 denotes the side wall, 6 the bottom, 7 the front wall, and 8 the cover of a typical automobile trunk, the cover being hinged to the front wall 7 as indicated at 9. For my purposes, the assembly just described serves as the main section of the trunk, and is open at the rear to receive a closing plate or back wall 10.

The closing plate 10 forms the rear wall of the trunk, and carries a bottom 11 and sides 12 rising from the same to lend the extension the form of the conventional drawer. The sides 12 are stiffened by inwardly pressed panels 13, and are formed at the top with inwardly directed bends 14, which cooperate with channeled moldings 15 secured by rivets 16 inside the sides 5 of the main section of the trunk, so that when the extension is moved into the main section, the moldings 15 will serve as a track and retainer for the bends 14 to keep the extension alined with the main section, and also to lend the extension a sliding motion in and out of the main section. The bottom 11 of the extension and the bottom 6 of the trunk are also formed to aline and relieve the working parts from friction by the characteristics of interfitting ridges 17 and 18 pressed respectively in the bottoms 11 and 6, as clearly shown in Figure 3. It will thus be seen that the extension may be slid in and out of the trunk with ease and without tendency to twist or bind. Also, the relatively limited area along which the sliding action occurs minimizes the amount of friction incident to the sliding of the extension, so that the latter may be operated with a minimum of effort.

In order that I may secure the full benefit of the extension, I have designed the same to slide out almost its full length, as clearly indicated in Figure 5, providing as a limit for this movement a pair of folding sides 19 and 20 above each of the sides 12 to supplement the latter. The sides 19 and 20 carry a vertical hinge set 21 in the rear corners of the main trunk section 5, a similar hinge set 22 in the corners of the rear plate 10, and a similar hinge set 23 between them, the hinge sets 21 and 22 being secured by suitable lugs 24 and 25 to the respective parts to which they relate. The sides 19 and 20 are intended to fold inwardly as the extension is slid into the main section 5, so that when the trunk is fully contracted or in normal condition the folded sides will appear as indicated by dotted lines in Figure 2 and by full lines in Figure 4. Conversely, when the extension is drawn out the sides will of themselves dilate to extended position, as indicated in Figures 1 and 5, forming a straight side wall at each side of the trunk to supplement the sides 12 thereof.

Each of the side sections 19 and 20 has an outward bottom molding 26 of channeled cross section, which closes against the bends 14 of the side walls 12 as the sides 19 and 20 attain fully extended positions, the bottom of the moldings 26 forming a shelf or platform under the wings or inward portions of said bends. Thus, the sides 12 receive support from the lower portions of the folding sides 19 and 20 when the extension is in use, precluding sagging tendencies on the part of the extension from the weight of its contents or of the spare tire adjunct 37. It should be realized that the folding sides when extended form a very strong element, since they have as a basis the strengthening hinge sets 21, which are in part rigidly fastened to the main trunk section. The very nature of the multi-sectional hinge sets affords a bearing of considerable length for the hinges, so that the sides 19 and 20 are capable of withstanding considerable strain from the weight of the extension or its contents without sagging or otherwise weakening. The sides as extended in fact form a reinforcing factor in the make-up of the extension without which factor the extension however firm or rigid would fail. For additional strength, I deem it advisable to press the sides 19 and 20 with panels 27, these also adding to the appearance of the extension.

In order that the top of the extension may not present thin edges which may cut or otherwise interfere with the smooth and ready loading of the extension, it is well to form inward horizontal bends 19a and 20a from the sides 19 and 20, which also present a neat appearance and furnish a rest for any object coming in contact with the top of the extension.

When the extension is open, it is advisable that the same be covered to exclude tampering by unauthorized persons or the entrance of falling objects or rain, and for this purpose I have designed an extension for the main cover 8 in the nature of a lid 28 which is hinged at 29 inside the rear portion of the cover 8. The lid 28 is shown extended in Figure 1 as the cover is about to be closed, in which event a lug 30 projecting from the lid is adapted to snap into a clip 31 carried by the rear plate 10 so as to hold the lid in closed position. However, when the lid is to be opened and the cover 8 swung back, the lid may be tucked into the cover by swinging the same downward in the direction of the latter, so as to occupy the position indicated by dotted lines in Figure 1. In this event, the extending lug 30 of the lid snaps into a clip 32 inside the cover 8, so that the lid may not depart from the folded position.

It is thus seen that I have provided a trunk with an extension on simple and rugged lines, and which has its side walls functioning not only as such and with the additional feature of limiting the egress of the extension, but more as a support and reinforcing element for the lower portion of the extension, whereby to prevent the same from sagging or vibrating even though it is almost fully extended from the main section of the trunk. The parts employed in the improved extension are large and strong, require no manual attention or adjustment, and are in readiness to cooperate toward the formation and support of the extension without any effort beyond that used to withdraw the extension from the trunk. The extension is designed to bear contents of any suitable nature and weight, yet it may be easily collapsed so as not to occupy an excess of space when it is not required for use.

While I have illustrated and described the invention in the preferred form, it will be evident that the same is capable of many minor changes and refinements, and I desire to claim such changes and refinements as coming within the spirit and scope of the appended claims.

I claim:

1. A trunk having a main section, a section extensible from the main section, said extensible section having fractional side walls slidable relative to the main section for guiding purposes and also having foldable side walls for supporting purposes and cooperating with the slidable walls to close the sides of said section when extended.

2. A trunk having a main section, a section extensible from the main section, said extensible section having fractional side walls slidable relative to the main section and also having foldable side walls cooperating with the slidable walls to close the sides of said section when extended and having hinge connections to the main section and to a part of the extensible section, whereby outward movement of the latter is limited.

3. A trunk having a main section, a section extensible from the main section, said extensible section having fractional side walls slidable relative to the main section and also having foldable side walls cooperating with the slidable walls to close the sides of said section when extended, a cover for the main section and a cover for the extensible section hinged to the main cover and foldable therebeneath and a latching means for the cover of the extensible section.

4. A trunk having a main section, a section extensible from the main section, said extensible section having fractional side walls slidable relative to the main section and also having hinged foldable side walls cooperating with the slidable walls to close the sides of said section when extended, the hinged connections of said side walls being all vertical.

In testimony whereof I affix my signature.

PHILMORE F. SPERY.